(12) United States Patent
Krishnan (10) Patent No.: US 9,509,030 B2
(45) Date of Patent: Nov. 29, 2016

(54) POWER MANAGEMENT SYSTEM FOR A MICROBIAL FUEL CELL AND MICROBIAL ELECTROLYSIS CELL COUPLED SYSTEM

(71) Applicant: Ajay Krishnan, Portland, OR (US)

(72) Inventor: Ajay Krishnan, Portland, OR (US)

(73) Assignee: Ajay Krishnan, Portland, OR (US)

( * ) Notice: Subject to any disclaimer, the term of this patent is extended or adjusted under 35 U.S.C. 154(b) by 717 days.

(21) Appl. No.: 13/847,004

(22) Filed: Mar. 19, 2013

(65) Prior Publication Data

US 2014/0285007 A1    Sep. 25, 2014

Related U.S. Application Data

(60) Provisional application No. 61/612,981, filed on Mar. 20, 2012.

(51) Int. Cl.
```
H02J 4/00      (2006.01)
H01M 16/00     (2006.01)
C25B 1/04      (2006.01)
H01M 8/04      (2016.01)
H01M 8/16      (2006.01)
C25B 15/02     (2006.01)
C25B 5/00      (2006.01)
```

(52) U.S. Cl.
CPC .............. *H01M 16/003* (2013.01); *C25B 1/04* (2013.01); *C25B 5/00* (2013.01); *C25B 15/02* (2013.01); *H01M 8/04932* (2013.01); *H01M 8/04947* (2013.01); *H01M 8/16* (2013.01); *H01M 2250/10* (2013.01); *Y02B 90/14* (2013.01); *Y02E 60/366* (2013.01); *Y02E 60/527* (2013.01); *Y02E 60/566* (2013.01); *Y10T 307/352* (2015.04)

(58) Field of Classification Search
CPC ...................... H01M 16/003; Y10T 307/352
USPC ........................................................ 307/24
See application file for complete search history.

(56) References Cited

U.S. PATENT DOCUMENTS

2013/0076145 A1\*  3/2013  Kim ...................... H02J 7/0063
                                                          307/77

\* cited by examiner

*Primary Examiner* — Fritz M Fleming
(74) *Attorney, Agent, or Firm* — Blakely Sokoloff Taylor & Zafman LLP (57) ABSTRACT

Various embodiments of the invention include a power management unit (PMU) to simultaneously control the production of hydrogen and electricity for external use in an MFC-MEC coupled system. In one embodiment, the PMU includes low voltage electronic switches using MOSFETs, and a PWM controller. The PWM controller creates timing waveform necessary to operate the switches. In other embodiments, the switches can be replaced by any switching regulator capable of operating at low operating voltage and currents that yield high efficiency. Such a system can be used in a waste-water treatment facility.

5 Claims, 10 Drawing Sheets

Figure 5:
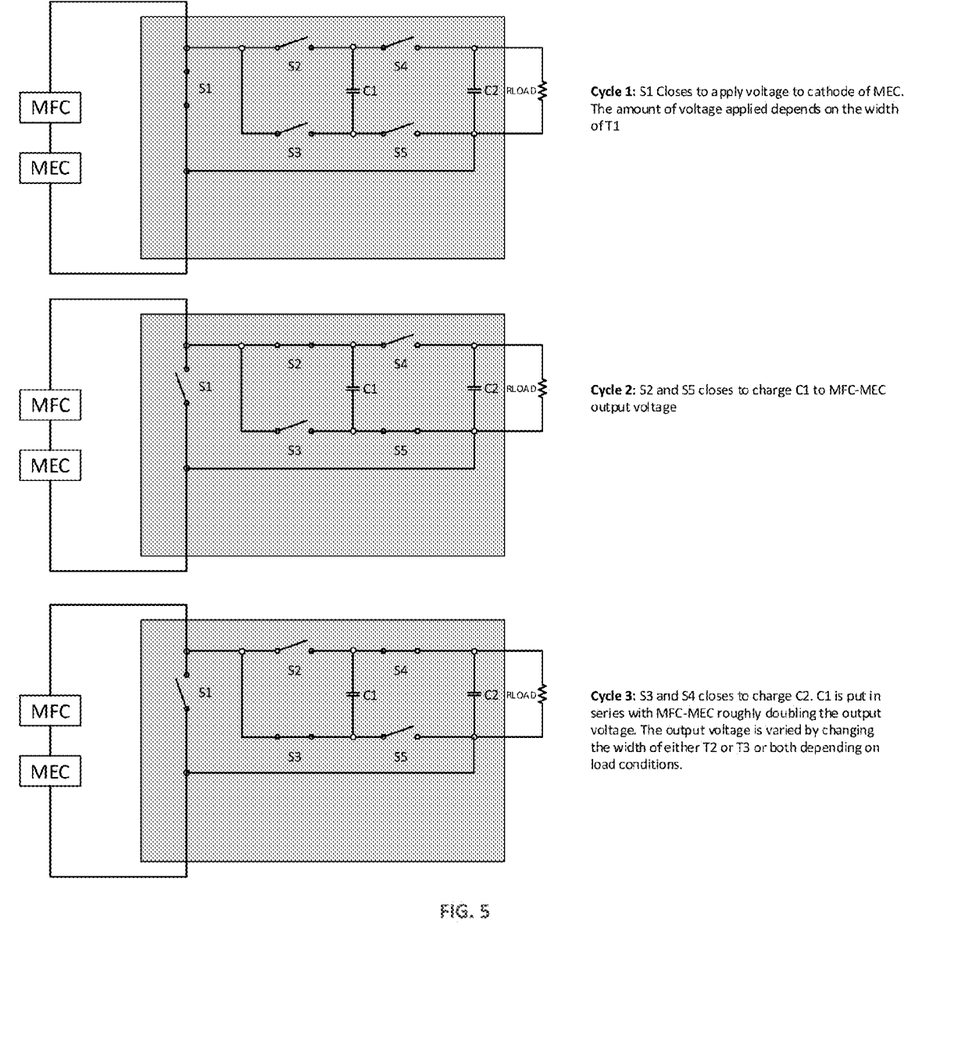
FIG. 5 details the working of switched capacitor based PMU over time.

Cycle 1: S1 Closes to apply voltage to cathode of MEC. The amount of voltage applied depends on the width of T1

Cycle 2: S2 and S5 closes to charge C1 to MFC-MEC output voltage

Figure 7:
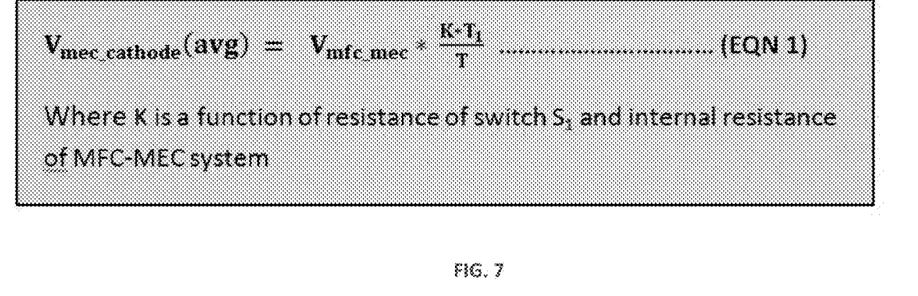
FIG. 7 is the equation that governs the voltage applied to the MEC.

Cycle 3: S3 and S4 closes to charge C2. C1 is put in series with MFC-MEC roughly doubling the output voltage. The output voltage is varied by changing the width of either T2 or T3 or both depending on load conditions.

$$V_{mec\_cathode}(avg) = V_{mfc\_mec} * \frac{K \cdot T_1}{T} \quad \text{............................ (EQN 1)}$$

Where K is a function of resistance of switch $S_1$ and internal resistance of MFC-MEC system

Figure 8:
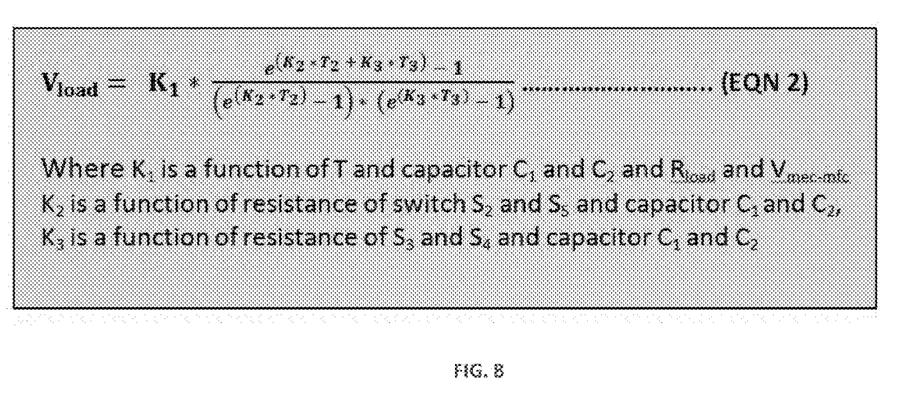
FIG. 8 is the equation that governs the output voltage of PMU that is available to power an electrical system.

FIG. 7

$$V_{load} = K_1 * \frac{e^{(K_2 \cdot T_2 + K_3 \cdot T_3)} - 1}{\left(e^{(K_2 \cdot T_2)} - 1\right) * \left(e^{(K_3 \cdot T_3)} - 1\right)} \quad \text{............................ (EQN 2)}$$

Where $K_1$ is a function of T and capacitor $C_1$ and $C_2$ and $R_{load}$ and $V_{mec\_mfc}$,
$K_2$ is a function of resistance of switch $S_2$ and $S_5$ and capacitor $C_1$ and $C_2$,
$K_3$ is a function of resistance of $S_3$ and $S_4$ and capacitor $C_1$ and $C_2$

POWER MANAGEMENT SYSTEM FOR A MICROBIAL FUEL CELL AND MICROBIAL ELECTROLYSIS CELL COUPLED SYSTEM

CLAIM OF PRIORITY

This non-provisional U.S. Utility Patent application is a conversion application and claims priority to the previously filed U.S. Provisional application No. 61/612,981, entitled "Power Management System for a Microbial Fuel Cell and Microbial Electrolysis Cell Coupled System", filed Mar. 20, 2012, the entire contents of which are incorporated herein by reference.

BACKGROUND OF THE INVENTION

Power Management Unit (PMU), in general is used to control power applied to an electrical load depending on load conditions and/or input power applied to the system. PMUs are implemented using solid-state device such as BJTs or FETs and capacitors and/or inductors. PMUs are switching regulators capable of boosting or bucking a DC input voltage applied to them.

Microbial Fuel Cells (MFC) are used to generate electricity while treating waste-water. Microbial Electrolysis cells (MEC) are used to produce hydrogen gas from waste-water by applying external power to it.

PMUs have been used to control the output power based on the power generating capabilities of the microbial fuel cell. MFC and MEC coupled systems are low-voltage systems (around 1V) and low current in the order of few hundred mA. Hence, the PMUs require electronic switches and other associated circuitry capable of operating under such low voltages and producing very little voltage drop across them.

Carbon Nanotubes and nanowires are used to improve charge transfer between anaerobic bacteria and anode surface of a microbial fuel cell.

Inverters together with PMUs and/or DC combiners are used to apply power to the electrical grid or local factory such as waste-water treatment plant either from an array of solar panels, stack of solid-oxide fuel cells using natural gas or other fuels, and farm of wind turbines.

BRIEF SUMMARY OF THE INVENTION

In this invention, PMU has been designed that controls the power applied to an electrical load consisting of a hydrogen producing fuel cell and an electrical system that supplies power to the consumer such as waste-water treatment plant simultaneously.

The PMU allows a means to control the production of hydrogen or electricity depending on demand conditions.

Traditionally, hydrogen production in a microbial electrolysis cell (MEC) or similar is controlled by varying the applied voltage through a potentiometer in a laboratory setting or through a solid-state power supply in a commercial setting. The "excess" voltage that was not utilized in hydrogen production has not been used to power other electrical loads such as electrical grid, commercial and residential facilities and waste-water treatment plants.

DETAILED DESCRIPTION OF THE INVENTION

Figure 1:
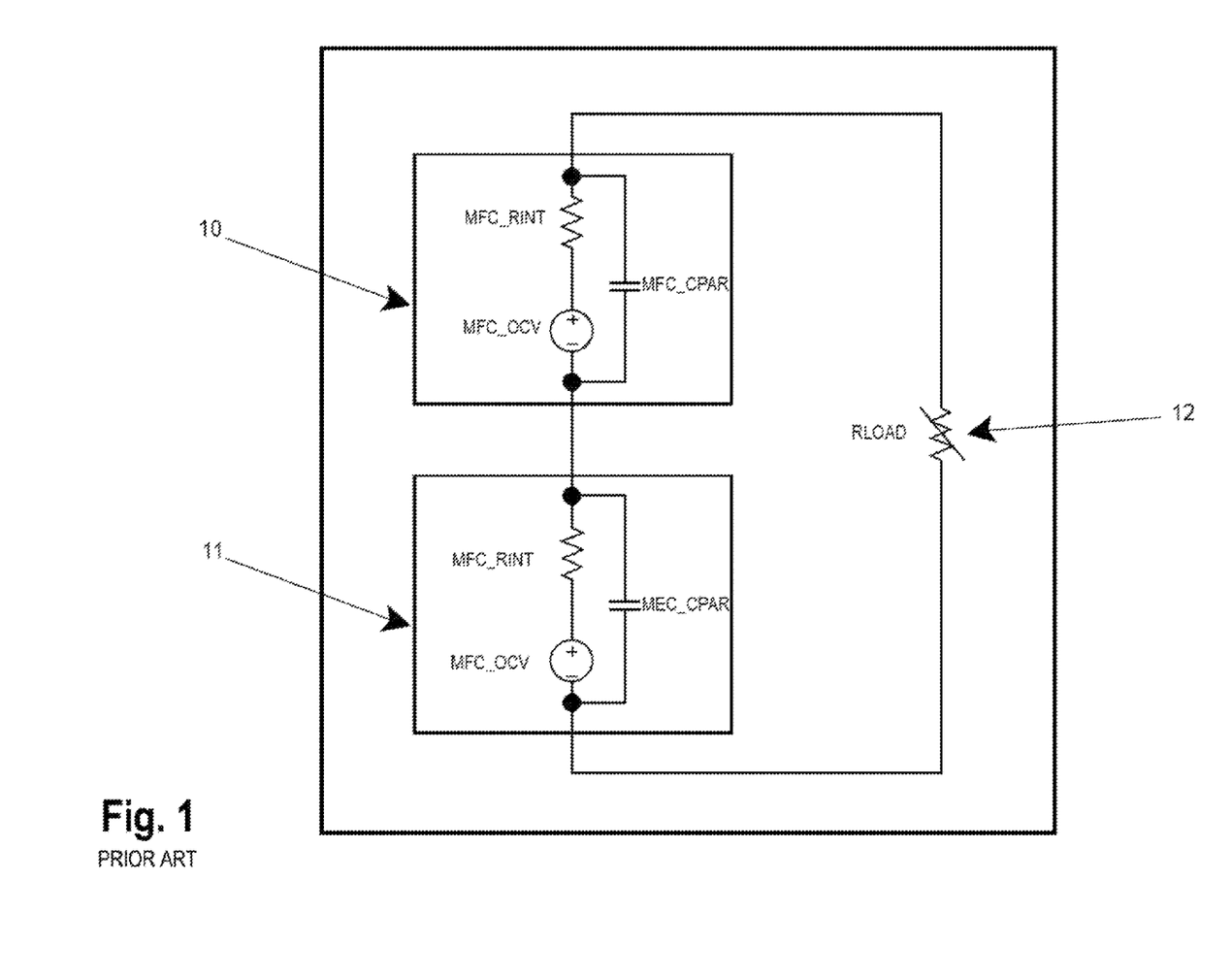
FIG. 1 illustrates a typical electrical circuit connection between MFC-MEC systems to control hydrogen production.

As shown in FIG. 1, the equivalent circuit of MFC is represented by 10, and that of MEC by 11. The potentiometer 12 is used to control the voltage and hence power applied to the MEC in a typical laboratory setting to control the hydrogen production. The drawback of this scheme is that the power is dissipated as heat in 12 reducing the efficiency of the system.

Figure 2:
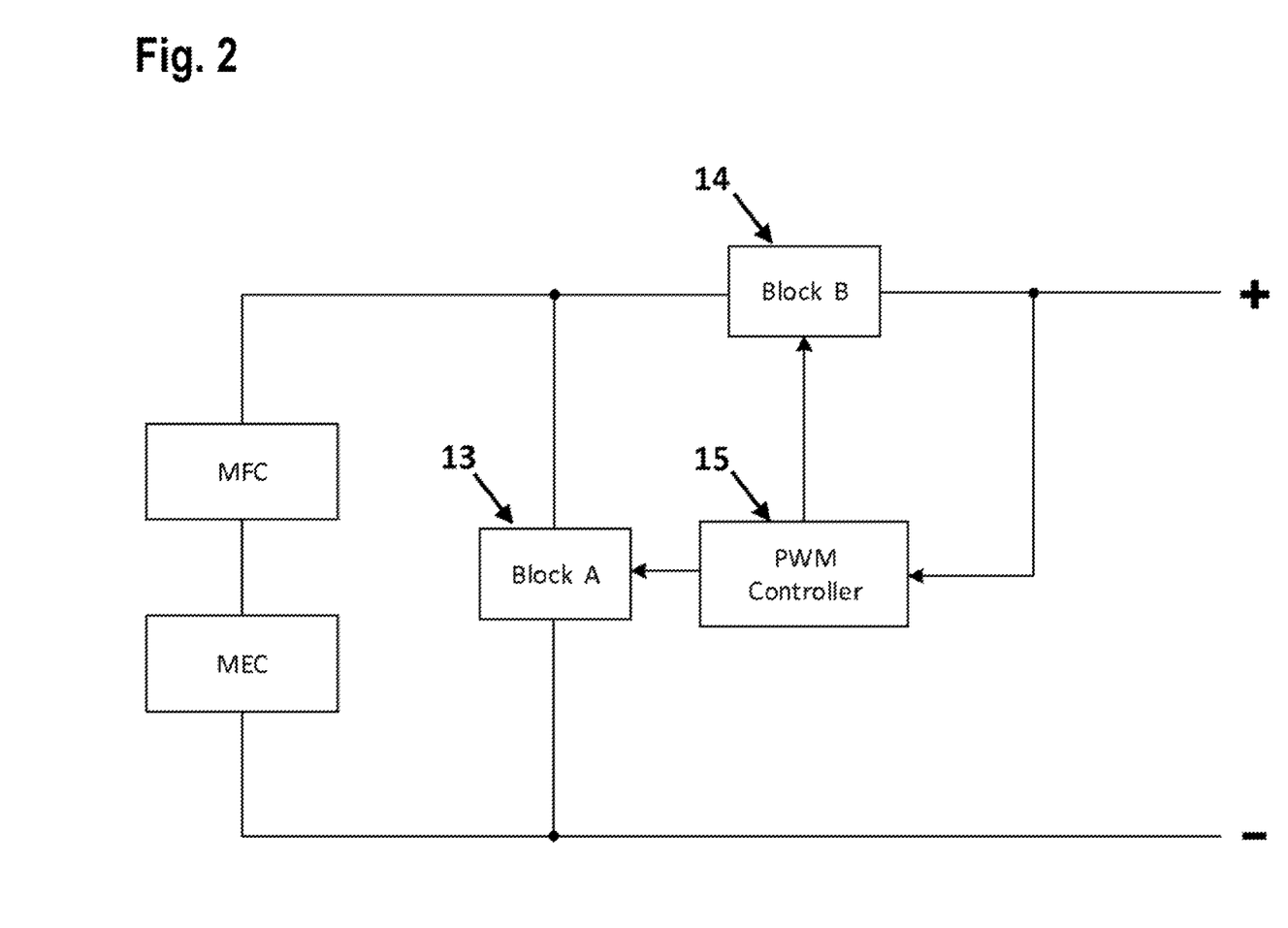
FIG. 2 illustrates an electrical circuit connection of MFC-MEC coupled system using electronic switches and controller to control hydrogen production and supply power to an external load simultaneously.

FIG. 2 shows the block diagram of the PMU design using electronic switch circuits 13 and 14 to obtain high efficiencies. The switch circuits 13 and 14 are controlled by 15, a PWM controller with a feedback from output in order to maintain the set output voltage. The switch circuits can be implemented using a switching regulator. This switching regulator can be of either capacitor or inductor based switching circuits.

Figure 3:
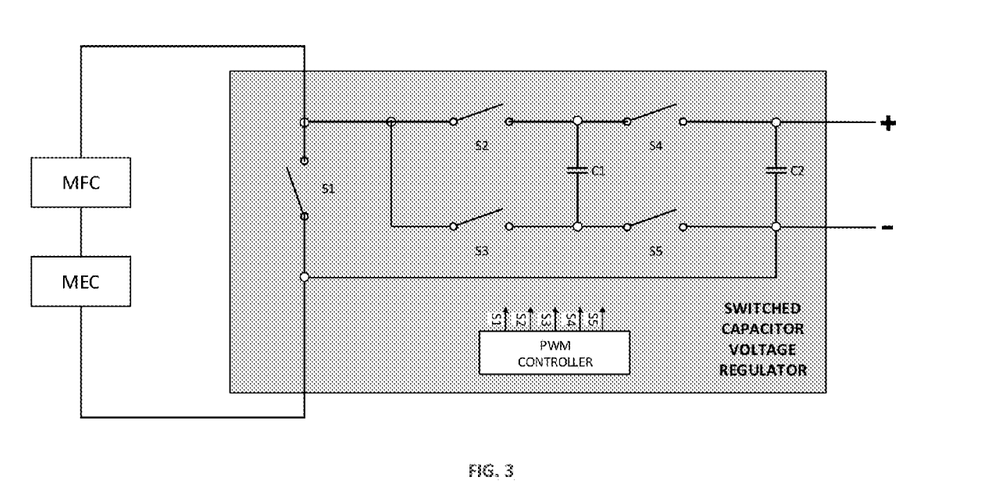
FIG. 3 is an electrical circuit diagram using a switched capacitor implementation of Power Management Unit.

FIG. 3 shows a typical implementation of PMU using switched-capacitor based circuit topology. This is a desired topology due to low currents and voltages of the MFC-MEC coupled system. Switches $S_1$-$S_5$ can be a MOSFETs (or ultra-low voltage semiconducting switching device) with low channel resistance to minimize power loss. PWM controller can be implemented using an off-the-shelf IC.

Figure 4:
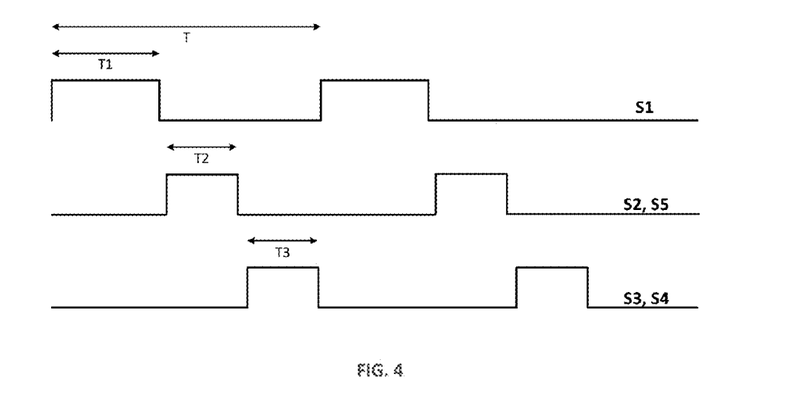
FIG. 4 is a timing diagram of the PMU using PWM controller and electronic switches.

FIG. 4 shows the timing diagram of the PWM controller. By adjusting the width of the timing pulse to $S_1$ with respect to the overall timing period T, the desired voltage is supplied to the cathode chamber of MFC. The width of the timing pulses, $T_2$ and $T_3$ determine the output voltage of the regulator for external use. $T_1$, $T_2$ and $T_3$ are all required to be non-overlapping timing pulses.

FIG. 5 details the working of the switched capacitor voltage regulator over a complete cycle of operation. The typical frequency of operation of the PWM controller is of the order of 100 KHz.

Figure 6:
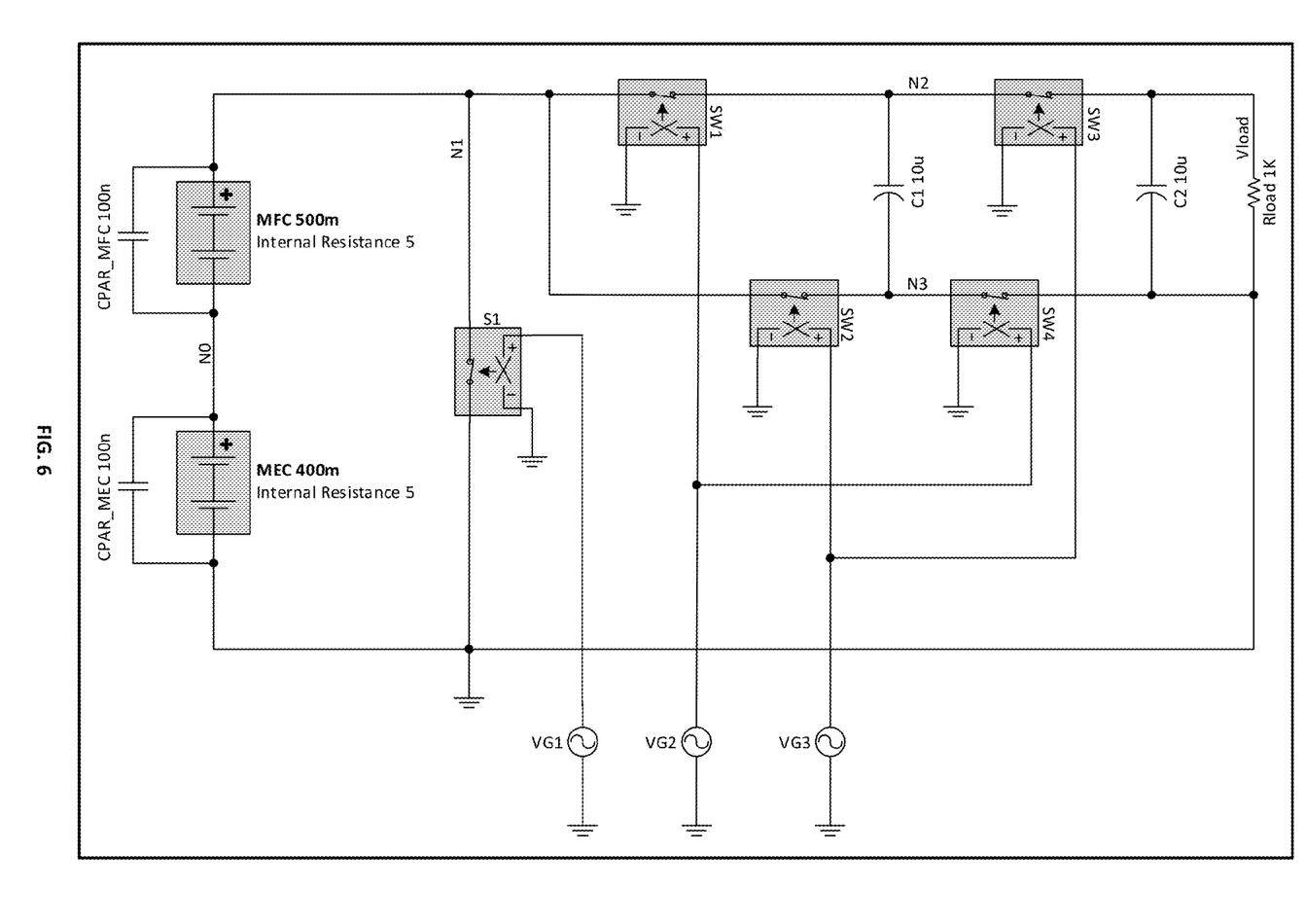
FIG. 6 is a schematic diagram setup for an electrical circuit simulation in TINA™.

FIG. 6 is a schematic diagram of the switched-capacitor based voltage regulator in a circuit simulator called TINA™. $VG_1$-$VG_3$ represent the PWM controller operating at about 100 KHz repetition rate. $S_1$-$S_5$ represent ideal switches with some resistance to reflect the channel resistance of MOSFETs. It is also set to have a low switching threshold voltage (~0.5V). The MFC and MEC is represented by a battery element with a reasonable internal resistance (5 ohms) typical of a large volume cell. Capacitors $C_1$ and $C_2$ are a typical low leakage capacitors such as tantalum. $R_{load}$ mimics the typical load expected of a single MFC-MEC coupled system.

FIG. 7 and FIG. 8 are the equations governing the voltage applied to the MEC and external load respectively based on timing periods, external load resistance, switch resistance and capacitor values.

Figure 9:
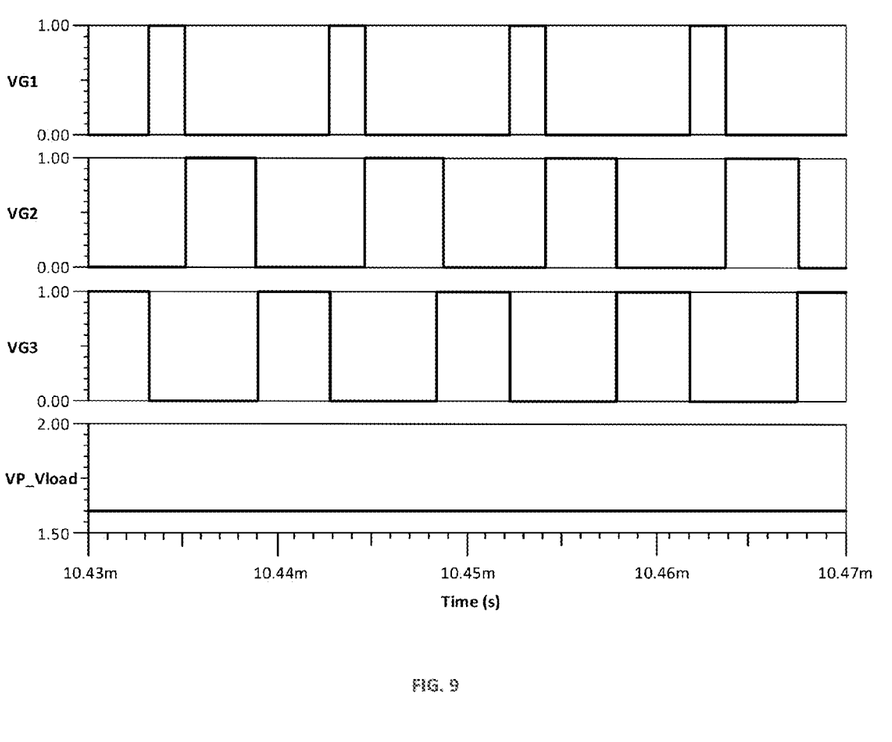
FIG. 9 is a timing diagram that corresponds to more power being made available to an external electrical system while less power made available for hydrogen production in MEC.

FIG. 9 shows the timing waveform of the simulation setup corresponding to minimum hydrogen production or more power to external load. The voltage delivered to the external load is about 1.3 volts. The amount of voltage applied to cathode chamber of MEC is about 0.2 volts.

Figure 10:
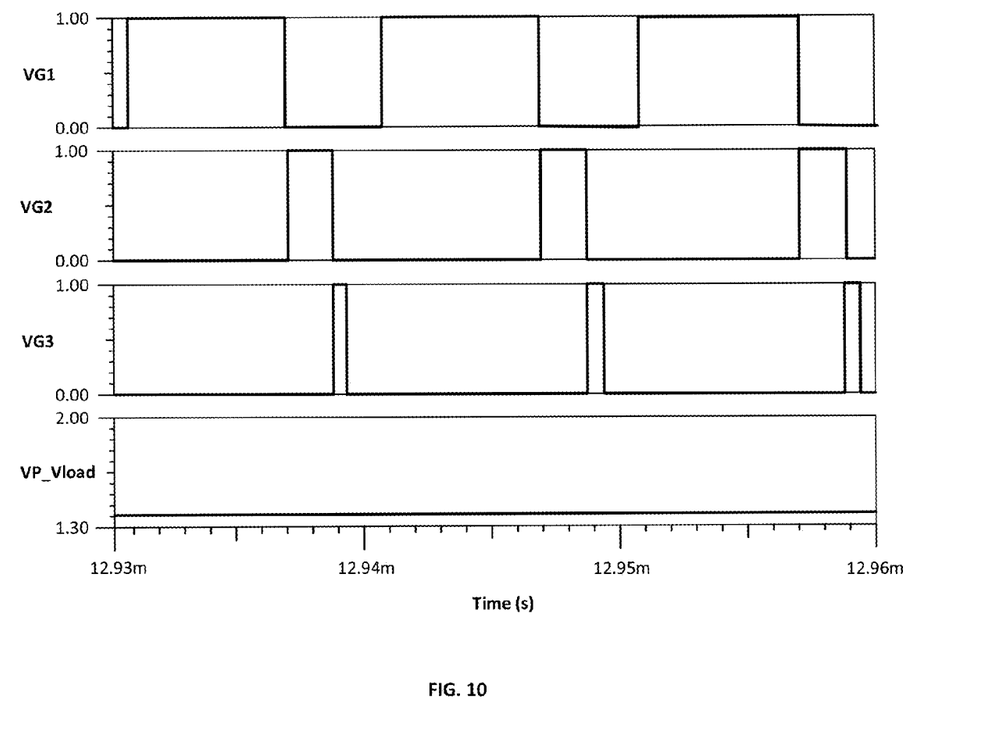
FIG. 10 is a timing diagram that corresponds to more power made available for increased hydrogen production while less power made available to the electrical system.

FIG. 10 shows the timing waveform of the simulation setup corresponding to the maximum hydrogen production or less power to the external load. The voltage delivered to the external load is about 0.2 volts. The amount of voltage applied to cathode chamber is about 1.0 volt.

Figure 11:
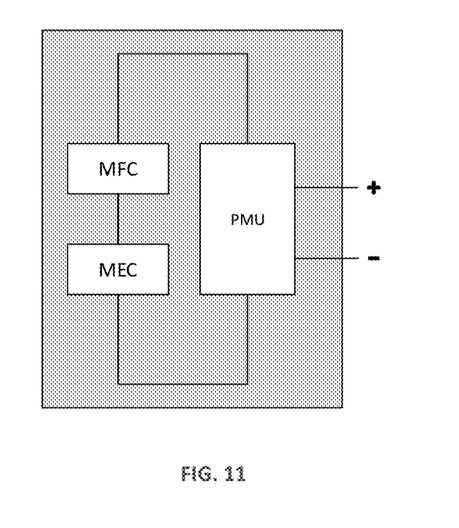
FIG. 11 is a block diagram of the MFC-MEC fuel cell system with built-in PMU shown as a basic building block.

FIG. 11 shows the basic building block of the MFC-MEC coupled system with a built-in PMU. The physical size of the building block is predominantly determined by the energy densities required at a waste-water treatment facility.

Figure 12:
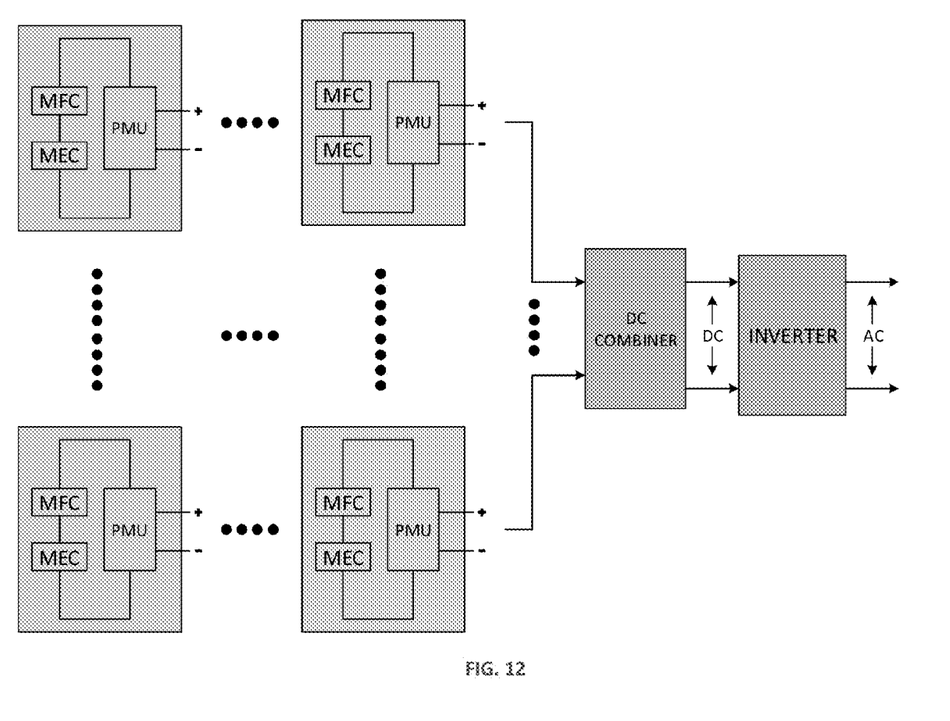
FIG. 12 shows an array of the MFC-MEC fuel cell system configuration to use in a typical waste-water treatment plant.

FIG. 12 shows the inter-connection of the basic building block to form a larger electrical system. The building blocks are connected in series to increase the terminal voltage of the combined system while in parallel to increase the current production. Several of the systems are connected in parallel once a give terminal voltage has been setup in a DC combiner box before feeding into an Inverter. The inverter is then connected to either an electrical grid or used locally to power the plant or residential or commercial facility.

What is claimed is:

1. A power management unit, comprising:
    a first electrical coupling from the power management unit to a Microbial Fuel Cells to Microbial Electrolysis Cell (MFC-MEC) system;
    a second electrical coupling from the power management unit to an external electrical load;
    an electrical circuit configuration having a first electronic switch to control power applied from the MFC-MEC system to a Microbial Electrolysis cells (MEC) system electrically interfaced to the MFC-MEC system via the first electronic switch through the power management unit, the MEC system to produce hydrogen gas from waste-water when the first electronic switch permits the power to be applied from the MFC-MEC system to the MEC system;
    the electrical circuit configuration having a second electronic switch to vary power provided to the external electrical load; and
    a Pulse Width Modulation (PWM) controller to control operation and timing of the first and the second electronic switches, wherein the first electronic switch to control power applied from the MFC-MEC system to the MEC system comprises the PWM controller to adjust width of timing pulses of the first electronic switch in accordance with an overall timing period (T) to yield a voltage supplied to a cathode chamber of the MEC system at a timing period 1 (T1), wherein the width of the timing pulses at a timing period 2 (T2) and at a timing period 3 (T3) determine an output voltage to the external electrical load through the second electronic switch, wherein the timing periods T1, T2 and T3 are non-overlapping timing pulses;
    wherein the electrical circuit configuration simultaneously controls power applied from the MFC-MEC system to the Microbial Electrolysis cells (MEC) system and varies the power provided to the external electrical load via the first and second electronic switches.

2. The power management unit of claim 1, wherein the first and second electronic switches each exceed 90% efficiency via either or both of semi-conducting materials and organic semi-conducting materials.

3. The power management unit of claim 1, wherein the electrical circuit configuration comprises at least switched-capacitors, an inductor-less or inductor based voltage regulator circuit, and the Pulse width modulation (PWM) controller to control operation and timing of the first and second electronic switches.

4. The power management unit of claim 1:
    wherein the power management unit (PMU) is embodied within the MFC-MEC system; and
    wherein the MFC-MEC system having the PMU embodied therein is part of an electrical system being electrically coupled in series or in parallel, or both, with other MFC-MEC systems having PMUs embodied therein to form a power plant.

5. The power management unit of claim 1, further comprising:
    electrical couplings with one or more electrical inverters through which to transmit AC power from the MFC-MEC system onto any of (i) an electrical grid or (ii) a local commercial power facility or (iii) a residential power facility or (iv) a waste-water treatment plant.

* * * * *